US005644575A

United States Patent [19]

McDaniel

[11] Patent Number: 5,644,575

[45] Date of Patent: Jul. 1, 1997

[54] MANAGING MEMORY WITHIN A LOCAL TELECOMMUNICATIONS NETWORK

[75] Inventor: David W. McDaniel, Dallas, Tex.

[73] Assignee: DSC Communications Corporation, Plano, Tex.

[21] Appl. No.: 567,967

[22] Filed: Dec. 6, 1995

[51] Int. Cl.$^6$ .................................................... H04L 12/56

[52] U.S. Cl. ........................... 370/416; 370/428; 395/873

[58] Field of Search ................................. 370/94.1, 94.2, 370/94.3, 60, 60.1, 61, 230–235, 346, 363, 412, 413, 414–448, 421, 428, 429; 340/825.02, 825.03; 395/859, 856, 867, 872, 873, 876

[56] References Cited

U.S. PATENT DOCUMENTS 5,446,733 8/1995 Tsuruoka ................................ 370/60.1
5,448,559 9/1995 Hayter et al. .......................... 370/60.1

*Primary Examiner*—Dang Ton
*Attorney, Agent, or Firm*—Baker & Botts, L.L.P.

[57] ABSTRACT

A telecommunications network (10) includes a plurality of transport node controllers (18) that interface with a plurality of local communication processors (16) for the transfer of telecommunications information between subscribers (14) associated with the local communication processors (16) and also for subscribers remote from the transport node controller (18). The transport node controller (18) includes a buffer memory (24) with a pool of buffers (26). A local processor controller (22), in conjunction with a remote processor (20), allocate the buffers (26) within the buffer memory (24) among the plurality of local communication processors (16) and remote communication processors communicating to the transport node controller (18) through a message transporting network (12). The local processor controller (22) assigns a buffer (26) to each of the plurality of local communication processors (16). A message processed by one of the local communication processors (16) is temporarily stored within its associated message-in buffer (26). The local processor controller (22) determines the destination for the message and places the address of the message-in buffer (26) into a message-out queue (32) associated with the destination local communication processor (16). The local processor controller (22) assigns a next message-in buffer (36) to the originating local communication processor (16) such that the originating local communication processor (16) can receive a new message.

23 Claims, 3 Drawing Sheets

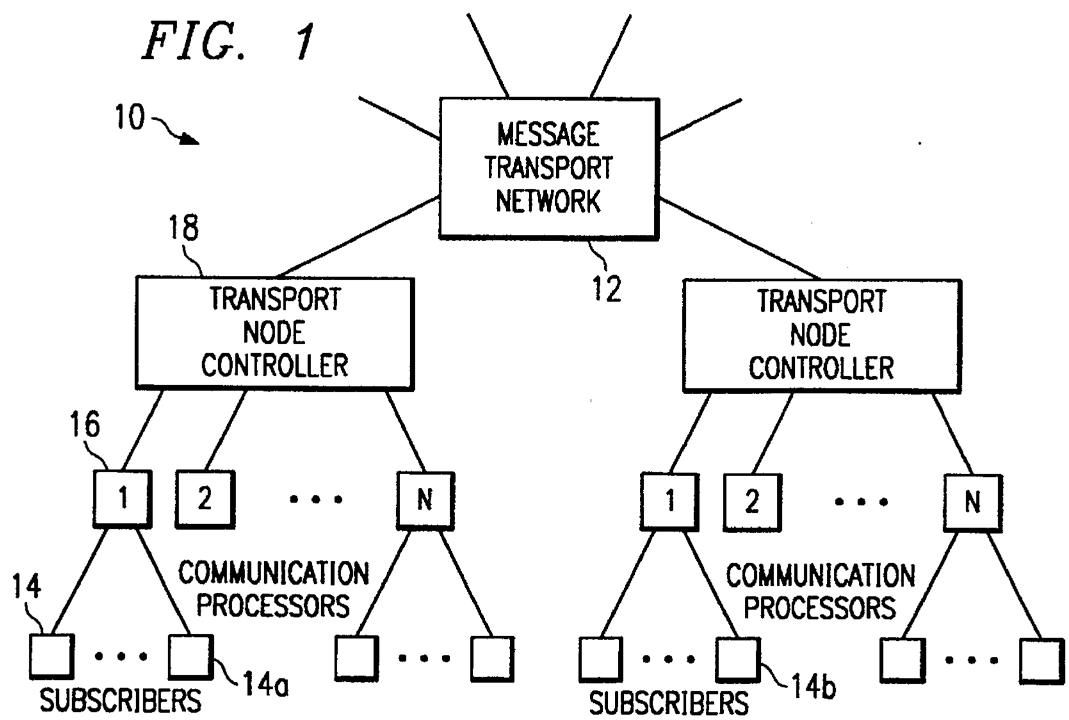
FIG. 1
10
MESSAGE
TRANSPORT
NETWORK
12
18
TRANSPORT
NODE
CONTROLLER
TRANSPORT
NODE
CONTROLLER
16
1
2
N
1
2
N
COMMUNICATION
PROCESSORS
COMMUNICATION
PROCESSORS
14
14a
14b
SUBSCRIBERS
SUBSCRIBERS

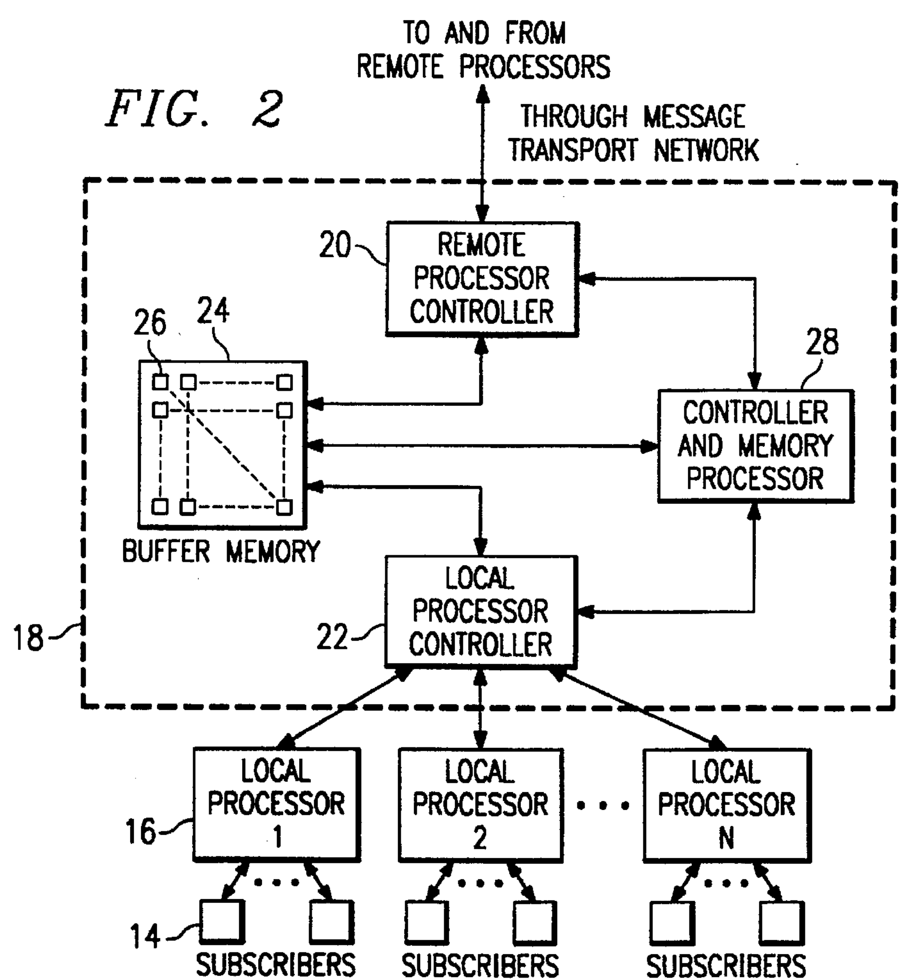
FIG. 2
TO AND FROM
REMOTE PROCESSORS
THROUGH MESSAGE
TRANSPORT NETWORK
20
REMOTE
PROCESSOR
CONTROLLER
26
24
28
CONTROLLER
AND MEMORY
PROCESSOR
BUFFER MEMORY
18
22
LOCAL
PROCESSOR
CONTROLLER
16
LOCAL
PROCESSOR
1
LOCAL
PROCESSOR
2
LOCAL
PROCESSOR
N
14
SUBSCRIBERS
SUBSCRIBERS
SUBSCRIBERS

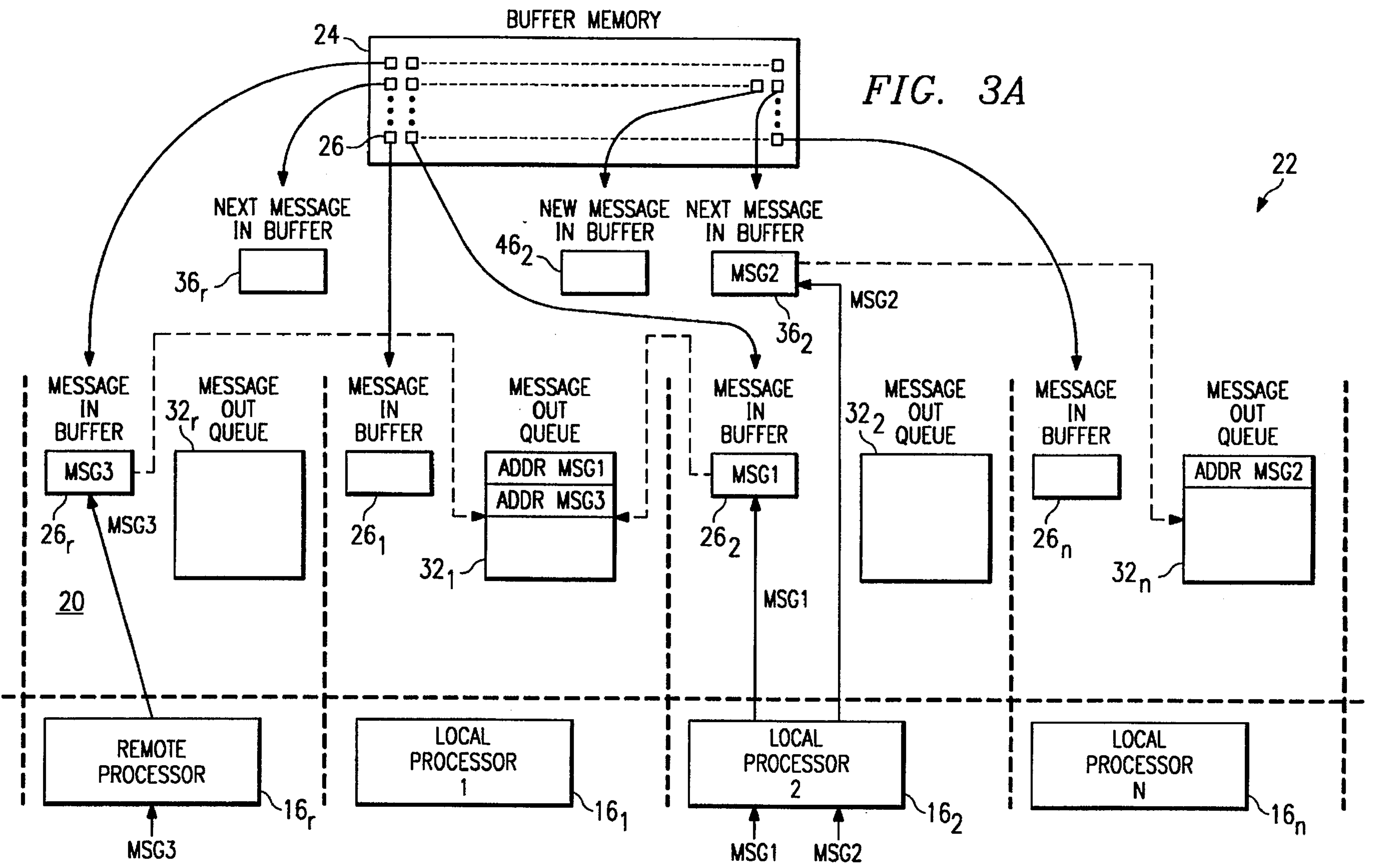
FIG. 3A
22
BUFFER MEMORY
24
26
NEXT MESSAGE IN BUFFER
$36_r$
NEW MESSAGE IN BUFFER
$46_2$
NEXT MESSAGE IN BUFFER
MSG2
$36_2$
MESSAGE IN BUFFER
MSG3
$26_r$
MESSAGE OUT QUEUE
$32_r$
MESSAGE IN BUFFER
$26_1$
MESSAGE OUT QUEUE
ADDR MSG1
ADDR MSG3
$32_1$
MESSAGE IN BUFFER
MSG1
$26_2$
MESSAGE OUT QUEUE
$32_2$
MESSAGE IN BUFFER
$26_n$
MESSAGE OUT QUEUE
ADDR MSG2
$32_n$
MSG3
MSG1
MSG2
20
REMOTE PROCESSOR
$16_r$
LOCAL PROCESSOR 1
$16_1$
LOCAL PROCESSOR 2
$16_2$
LOCAL PROCESSOR N
$16_n$

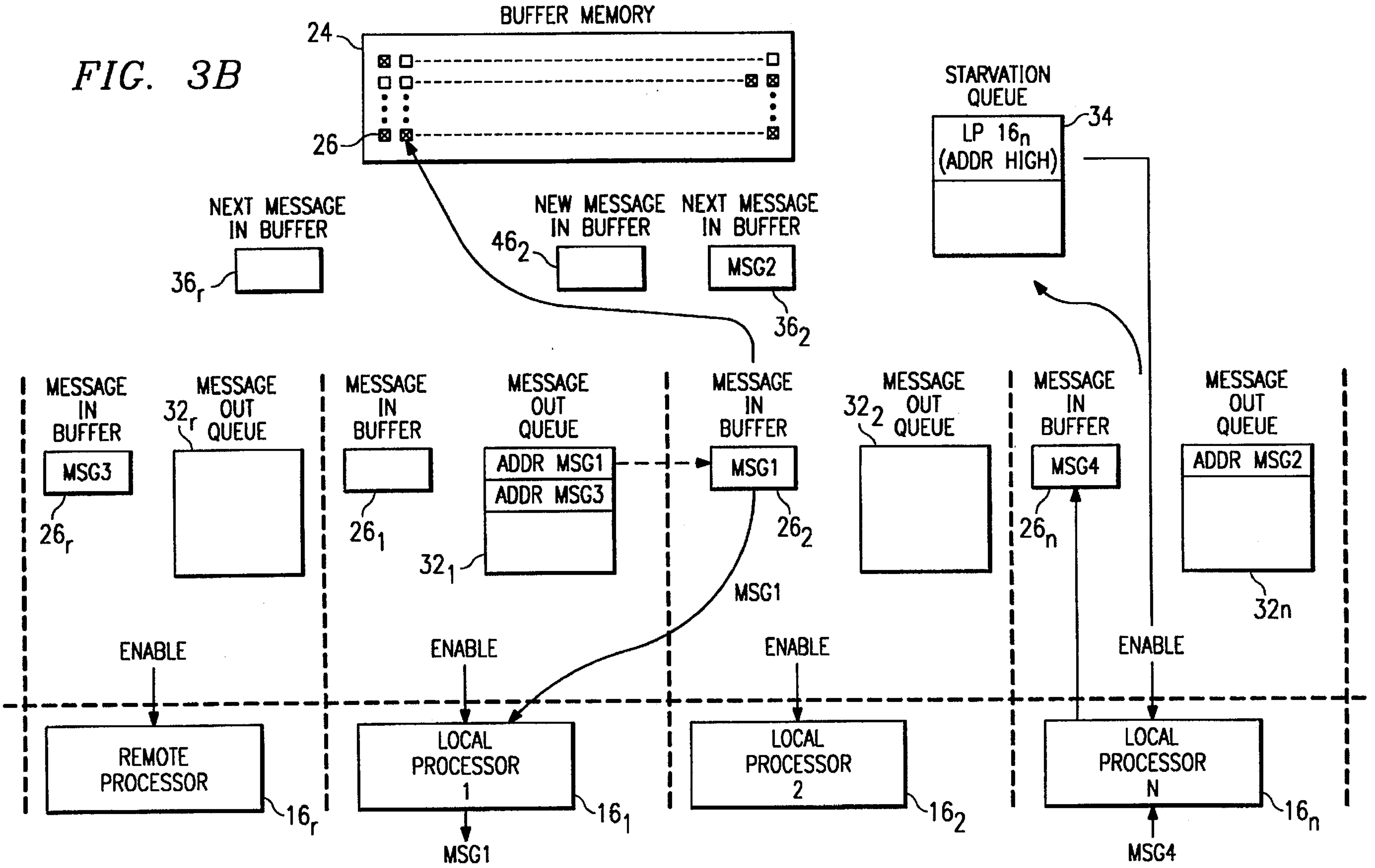
FIG. 3B
BUFFER MEMORY
24
26
STARVATION QUEUE
LP $16_n$ (ADDR HIGH)
34
NEXT MESSAGE IN BUFFER
$36_r$
NEW MESSAGE IN BUFFER
$46_2$
NEXT MESSAGE IN BUFFER
MSG2
$36_2$
MESSAGE IN BUFFER
MSG3
$26_r$
MESSAGE OUT QUEUE
$32_r$
MESSAGE IN BUFFER
$26_1$
MESSAGE OUT QUEUE
ADDR MSG1
ADDR MSG3
$32_1$
MESSAGE IN BUFFER
MSG1
$26_2$
MESSAGE OUT QUEUE
$32_2$
MESSAGE IN BUFFER
MSG4
$26_n$
MESSAGE OUT QUEUE
ADDR MSG2
32n
MSG1
ENABLE
REMOTE PROCESSOR
$16_r$
ENABLE
LOCAL PROCESSOR 1
MSG1
$16_1$
ENABLE
LOCAL PROCESSOR 2
$16_2$
ENABLE
LOCAL PROCESSOR N
MSG4
$16_n$

MANAGING MEMORY WITHIN A LOCAL TELECOMMUNICATIONS NETWORK

TECHNICAL FIELD OF THE INVENTION

The present invention relates in general to telecommunication systems and more particularly to a method and system for managing memory within a local telecommunications network.

BACKGROUND OF THE INVENTION

Memory allocation in a telecommunications switching system is typically controlled by the message rate entering the switch and transport demands based on congestion rates. Heuristic analysis of switch demand has typically been used to assist in determining the proper allocation of memory for the transport of messages through the telecommunications switch. However, heuristic approaches lead to unfair memory allocation. Further, allocating memory based on the message rate may cause certain side effects that may hamper the efficient transfer of telecommunications information. Therefore, it is desirable to allocate memory within a telecommunications switch that is not determined by message rates or heuristic analysis.

SUMMARY OF THE INVENTION

In accordance with the present invention, a method and system for managing memory within a local telecommunications network are provided that substantially eliminate or reduce disadvantages and problems associated with conventional telecommunications systems.

According to an embodiment of the present invention, there is provided a method of managing memory within a local telecommunications network that includes associating a pool of buffers with a first local communication processor and a second local communication processor. A message-in buffer from the pool of buffers is associated with the second local communication processor. A message-out queue is associated with the first local communication processor. A buffer location is received at the message-out queue associated with the first local communication processor. The buffer location corresponds to the message-in buffer associated with the second local communication processor, with the message-in buffer associated with the second local communication processor containing a message destined for the first local communication processor. An empty buffer within the pool of buffers is assigned as a next message-in buffer associated with the second local communication processor in order that the second local communication processor can process a new message.

The present invention provides various technical advantages over conventional management systems within a telecommunications network. For example, one technical advantage is to efficiently manage memory within a local telecommunications network. Another technical advantage is to provide throttling at the local communication processor based on memory receive rates without denying access to the memory for other local communication processors. Yet another technical advantage is to provide access sharing of a memory for both local and remote communication processors. Still, another technical advantage is to put back pressure on the local communication processors when a destination processor is busy. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which:

FIG. 1 illustrates a block diagram of a telecommunications network;

FIG. 2 illustrates a block diagram of a transporting node controller within the telecommunications network; and FIGS. 3A–B illustrate a block diagram of how memory is managed by the transporting node controller within the telecommunications network.

DETAILED DESCRIPTION OF THE INVENTION

FIG. 1 is a block diagram of a telecommunications network 10. Telecommunications network 10 includes a message transport network 12 that transfers telecommunication information among a plurality of subscribers 14. Each of the subscribers 14 receives and sends telecommunication information from and to an associated communication processor 16, respectively. Each communication processor 16 transfers telecommunication information to and from subscribers 14 either locally for locally situated subscribers such as subscriber **14*a* and subscriber 14*b* or remotely between a local subscriber 14*a* and a remote subscriber 14*c*. Communications processor 16 interfaces with a transport node controller 18 which supervises and controls the transfer of telecommunications information between subscribers 14 local to transport node controller 18 and between subscribers 14 local to transport node controller 18 and subscribers 14 remote from transport node controller 18**.

FIG. 2 is a block diagram of transporting node controller 18. Transport node controller 18 includes a remote processor controller 20 that interfaces with remote communication processors 16 through message transport network 12. Transport node controller 18 also includes a local processor controller 22 that interfaces with local communication processors 16 in communication with local subscribers 14. Telecommunications information entering transport node controller 18, either remotely through remote processor controller 20 or locally through local processor controller 22, is temporarily stored in a buffer memory 24. Buffer memory 24 includes a pool of buffers 26 that store telecommunications information messages destined from one subscriber 14 to another subscriber 14 for either a remote or local transfer. Transport node controller 18 includes a controller and memory processor 28 that provides supervision and control of buffer memory 24, local processor controller 22, and remote processor controller 20. Local processor controller 22 and remote processor controller 20, in response to controller and memory processor 28, manage the pool of buffers 26 within buffer memory 24 to provide an effective and efficient transfer of telecommunication information within telecommunication network 10.

FIGS. 3A–B illustrate the management of buffer memory 24 by local processor controller 22 and remote processor controller 20. As shown in FIG. 3A, each local communication processor $\mathbf{16}_{1-n}$ and a remote communication processor $\mathbf{16}_r$ are assigned a buffer 26 from a pool of buffers within buffer memory 24. Buffers $\mathbf{26}_r$ and $\mathbf{26}_{1-n}$ assigned to local communication processors $\mathbf{16}_{1-n}$ and remote communication processor $\mathbf{16}_r$ are identified as Message-In buffers $\mathbf{26}_r$ and $\mathbf{26}_{1-n}$, respectively. Message-In Buffer 26 receives a message from a subscriber 14 as processed by its associated local communication processor 16. Each local communication processor $\mathbf{16}_{1-n}$ and remote communication processor $\mathbf{16}_r$ is assigned a message-out queue $\mathbf{32}_r$ and $\mathbf{32}_{1-n}$, respectively. Message-out queue 32 stores the location of a message-in buffer 26 containing a message destined for the local communication processor 16 associated with message-out queue 32. Also associated with each local communication processor 16 and remote processor 30, is a starvation queue 34 that is designed to hold the identity of a local communication processor 16 when there are no buffers available from the pool buffers within buffer memory 24.

In operation, local processor controller 22, through controller and memory processor 28, assigns a message-in buffer $\mathbf{26}_{1-n}$ to each of local communication processors $\mathbf{16}_{1-n}$. Similarly, remote processor controller 20 assigns a message-in buffer $\mathbf{26}_r$, through controller and memory processor 28, to remote communication processor $\mathbf{16}_r$. From the pool of buffers within buffer memory 24. Upon receiving a message, local communication processor 16 processes the received message and routes the message MSG1 to its assigned message-in buffer 26. In the example illustrated, local communication processor $\mathbf{16}_2$, processors message MSG1 receive from a subscriber 14 and places message MSG1 into its associated message-in buffer $\mathbf{26}_2$. Local processor controller 22 determines the destination for message MSG1, in this instance local communication processor $\mathbf{16}_1$, and places the address location for message-in buffer $\mathbf{26}_2$ into message-out queue 32 $of_1$ local communication processor $\mathbf{16}_1$ corresponding to the destination for message MSG1. With message-in buffer $\mathbf{26}_2$ now occupied with message MSG1, local processor controller 22 assigns a next message-in buffer 362 from the pool of buffers within buffer memory 24. Local communication processor $\mathbf{16}_2$ is now ready to receive and process a second message that can be placed within next message-in buffer $\mathbf{36}_2$.

Upon receiving a second message, MSG2, local communication processor $\mathbf{16}_2$ processes message MSG2 for placement into next message-in buffer $\mathbf{36}_2$. Local processor controller 22 determines the destination for message MSG2, in this instance, a subscriber 14 at local communication processor $\mathbf{16}_n$. Local processor controller 22 stores the address location of next message-in buffer $\mathbf{36}_2$ within message-out queue $\mathbf{32}_n$ associated with local communication processor $\mathbf{16}_n$. Local processor controller 22 then assigns a new message-in buffer $\mathbf{46}_2$ allowing local communication processor $\mathbf{16}_2$ to receive and process a new message.

For a message MSG3 received and processed by remote communication processor $\mathbf{16}_r$, remote processor controller 20 supervises placement of message MSG3 within message-in buffer $\mathbf{26}_r$ assigned to remote communication processor $\mathbf{16}_r$. Remote processor controller 20 determines the destination for message MSG3, in this instance local communication processor $\mathbf{16}_1$. Remote processor controller 20 places the address location of message-in buffer $\mathbf{26}_r$ containing message MSG3 into message-out queue $\mathbf{32}_1$ associated with local communication processor $\mathbf{16}_1$. Remote processor controller 20 then assigns a next message-in buffer $\mathbf{36}_r$ to allow remote communication processor $\mathbf{16}_r$ to receive and process a new message.

Remote processor controller 20 and local processor controller 22 will continue to assign message-in buffers 26 for the routing of messages within telecommunications network 10 until the situation occurs when there is no available buffer 26 within the pool of buffers of buffer memory 24.

Each message-out queue 32 is designed to hold address locations for a finite number of message-in buffers 26. The size of message-out queues 32 may depend on the design requirements of local processor controller 22 and remote processor controller 20 and desired system operation. For illustration purposes, the size of message-out queue 32, is assumed to be sufficient to hold two address locations for message-in buffers 26. As shown in FIG. 3B, for a new message MSG4 entering transport node controller 18 from local communication processor 16 and destined for local communication processor $\mathbf{16}_1$, local processor controller 22 places message MSG4 into message-in buffer $\mathbf{26}_n$ associated with local communication processor $\mathbf{16}_n$. In normal operation, local processor controller 22 would place the address location of message-in buffer $\mathbf{26}_n$ into message-out queue $\mathbf{32}_1$ and assign a next message-in buffer $\mathbf{36}_n$ to local communication processor $\mathbf{16}_n$. However, message-out queue $\mathbf{32}_1$ is full and will not accept a new address location. In this situation, the identity of local communication processor $\mathbf{16}_n$ is placed into starvation queue 34. Local processor controller 22 then disables local communication processor $\mathbf{16}_n$ to prevent processing of new messages to and from subscribers 14 associated with local communication processor $\mathbf{16}_n$. This disablement forces back pressure to be applied to local communication processor $\mathbf{16}_n$ and its associated subscribers 14 such that telecommunication network 10 operates based on the receiving rate of a destination local communication processor 16.

Enablement of local communication processor $\mathbf{16}_n$ may occur in several ways. A first mode of operation may have message-in buffer $\mathbf{26}_n$ be given a special flag or notation that is set to identify that local communication processor $\mathbf{16}_n$ associated with message-in buffer $\mathbf{26}_n$ has its identity placed into starvation queue 34 and has been disabled. When space becomes available within message-out queue 32, local processor controller 22 places the address location of message-in buffer $\mathbf{26}_n$ into the available space of message-out queue. The identity of local communication processor $\mathbf{16}_n$ remains in starvation queue 34 and local communication processor $\mathbf{16}_n$ remains disabled until the address location of message-in buffer $\mathbf{26}_n$ reaches the top of message-out queue $\mathbf{32}_1$. Local processor controller 22 transfers message MSG4 from message-in buffer $\mathbf{26}_n$ to local communication processor $\mathbf{16}_1$ for transfer to the destination subscriber 14. The special flag associated with message-in buffer $\mathbf{26}_n$ is cleared, message-in buffer $\mathbf{26}_n$ is reassigned to local communication processor $\mathbf{16}_n$, the identity of local communication processor $\mathbf{16}_n$ is removed from starvation queue 34, and local communication processor $\mathbf{16}_n$ is enabled to process a new message. This first mode of operation prevents local communication processor $\mathbf{16}_n$ from rapidly oscillating between an enabled and disabled state that may effect reliability and operation of transport node controller 18.

In a second operating mode, local processor controller 22 may assign a next message-in buffer $\mathbf{36}_n$ to local communication processor $\mathbf{16}_n$ when the address location of message-in buffer $\mathbf{26}_n$ can be placed into available space within message-out queue $\mathbf{32}_1$, indicating that a buffer is available for assignment. In this second operating mode, a special flag is not needed for message-in buffer $\mathbf{26}_n$. The identity of local communication processor $\mathbf{16}_n$ is removed from starvation queue 34 and local communication processor $\mathbf{16}_n$ is enabled upon assignment of a next message-in buffer $\mathbf{36}_n$. Though this second operating mode is less efficient in that local communication processors 16 may rapidly oscillate between enabled and disabled states, local communication processors 16 have equal access to available buffers such that a fair buffer allocation occurs among local communication processors 16.

In another operating mode, the address location for message-in buffer $\mathbf{26}_n$ may be placed in starvation queue 34 until such time that space becomes available within message-out queue $32_1$ associated with local processor $16_1$. Local processor $16_n$ may be disabled or remain enabled and forced to internally queue up any further messages received and processed from subscribers 14 until such time that an empty buffer 26 can be assigned to local processor $16_n$. In this instance, local processor $16_n$ would have to wait on local processor controller 22 for message transfer. Remote processor controller 20 operates similarly in assigning buffers 26 and with working with starvation queue 34 as local processor controller 22.

After controlling the placement of messages within buffer memory 24, local processor controller 22 and remote processor controller 20 also supervise and control the transfer of messages out of buffer memory 24. FIG. 3B shows the memory management for the transfer of messages from buffer memory 24. When local communication processor $16_1$ is ready to transfer messages destined for subscribers 14 associated with local communication processor $16_1$, local processor controller 22 checks message-out queue 32 associated with local communication processor $16_1$ for an address location of a message-in buffer 26. In this instance, local processor controller 22 identifies that message-out queue $32_1$ has the address location for message MSG1 at the top of the queue corresponding to message-in buffer $26_2$. Using the address location of message-in buffer $26_2$ holding message MSG1 from message-out queue $32_1$, local process controller 22 transfers message MSG1 from message-in buffer $26_2$ to local communication processor $16_1$ for processing and transfer to the destination subscriber 14. Upon completion of the transfer of message MSG1 to local communication processor $16_1$, local processor controller 22 reassigns message-in buffer $26_2$ back to the pool of buffers of buffer memory 24. Message-in buffer $26_2$ is now available to be assigned to any local or remote processor as determined by local processor controller 22.

In summary, a transport node controller provides for a fair and efficient allocation of memory among a plurality of local processors and the remote processor within a telecommunication network. Buffers within a pool of buffers of the buffer memory are assigned to local and remote processors based on availability and need without causing effects from one local subscriber to another.

Thus, it is apparent that there has been provided, in accordance with the present invention, a method and system for managing memory within a local telecommunications network that satisfies the advantages set forth above. Although the preferred embodiment has been described in detail, it should be understood that various changes, substitutions, and alterations can be made herein. For example, buffers may be assigned based on message priority, processor priority or congestion optimization. Other examples are readily apparent to one skilled in the art and may be made without departing from the spirit and scope of the present invention as defined by the following claims.

What is claimed is:

1. A method of managing memory within a local telecommunications network, comprising the steps of:

associating a pool of buffers with a first local communication processor and a second local communication processor;

associating a message-in buffer from the pool of buffers with the second local communication processor;

associating a message-out queue with the first local communication processor;

placing a buffer location into the message-out queue associated with the first local communication processor, the buffer location corresponding to the message-in buffer associated with the second local communication processor, the message-in buffer associated with the second local communication processor containing a message destined for the first local communication processor;

assigning an empty buffer within the pool of buffers as a next message-in buffer associated with the second local communication processor.

2. The method of claim 1, further comprising the step of: transmitting the message contained in the message-in buffer associated with the second local communication processor to the first local communication processor in response to the buffer location appearing at a top of the message-out queue associated with the first local communication processor.

3. The method of claim 2, further comprising the step of: returning the message-in buffer corresponding to the buffer location into the pool of buffers upon transmission of the message.

4. The method of claim 1, further comprising the steps of:

associating a starvation queue with the first and second local communication processors;

placing the buffer location corresponding to the message-in buffer associated with the second local communication processor into the starvation queue in response to an indication that no empty buffers are available in the pool of buffers.

5. The method of claim 4, further comprising the step of:

informing the second local communication processor that there are no buffers currently available to receive a new message.

6. The method of claim 5, further comprising the step of:

queuing messages at the second local communication processor until a new message-in buffer has been associated with the second local communication processor.

7. The method of claim 6, further comprising the step of:

placing the buffer location from the starvation queue into the message-out queue associated with the first communication processor upon an indication that a buffer is available for assignment from the pool of buffers.

8. The method of claim 1, further comprising the step of:

receiving buffer locations of message-in buffers associated with other local communication processors of the local telecommunications network at the message-out queue associated with the first local communication processor.

9. The method of claim 8, further comprising the step of:

prioritizing the buffer locations stored in the message-out queue associated with the first local communication processor.

10. The method of claim 1, wherein the message-out queue is a first in first out storage element.

11. The method of claim 1, further comprising the step of:

associating a remote message-in buffer to a remote communication processor outside of the local telecommunications network;

associating a remote message-out queue with the remote communication processor;

receiving a buffer location of the remote message-in buffer associated with the remote communication processor at the message-out queue associated with the first communication processor in response to a remote message received at the remote message-in buffer, the remote message being destined for the first communication processor, the second communication processor having equal access to buffers within the pool of buffers as the remote communication processor.

12. The method of claim 1, further comprising the steps of:

associating a starvation queue with the first and second local communication processors;

placing an identity of the second local communication processor into the starvation queue in response to an indication that the message-out queue associated with the first local communication processor has no space available for the buffer location corresponding to the message-in buffer associated with the second communication processor.

13. The method of claim 12, further comprising the step of:

disabling the second local communication processor upon placing its identity into the starvation queue.

14. The method of claim 12, further comprising the steps of:

receiving an indication that space is available in the message-out queue associated with the first local communication processor;

placing the buffer location into the message-out queue associated with the first local communication processor;

removing the identity of the second local communication processor from the starvation queue; and enabling the second local communication processor.

15. A route controller system for allocating memory within a local telecommunications network, comprising:

a plurality of local communication processors for sending and receiving telecommunications information;

a pool of buffers associated with the plurality of local communication processors, each local communication processor associated with a message-in buffer assigned from an empty buffer of the pool of buffers, each message-in buffer capable of receiving telecommunications information from its corresponding local communication processor;

a message-out queue associated with each of the plurality of local communication processors, a message-out queue associated with a first one of the plurality of local communication processors operable to store a buffer location of a message-in buffer associated with a second one of the plurality of local communication processors in response to the message-in buffer associated with the second one of the plurality of local communication processors receiving telecommunications information destined for the first one of the plurality of local communication processors;

a local controller operable to assign an empty buffer as a new message-in buffer for the second one of the plurality of local communication processors from the pool of buffers in response to the message-in buffer associated with the second one of the plurality of communication processors receiving telecommunications information therefrom.

16. The system of claim 15, wherein the local controller is operable to transmit the telecommunication information from the message-in buffer associated with the second one of the plurality of local communication processors to the first one of the plurality of local communication processors in response to the buffer location reaching a top of the message-out queue associated with the first one of the plurality of local communication processors.

17. The system of claim 16, wherein the local controller is operable to return the message-in buffer associated with the second one of the plurality of local communication processors to the pool of buffers upon transmission of the telecommunications message from the message-in buffer.

18. The system of claim 15, further comprising:

a starvation queue associated with the plurality of local communication processors, the starvation queue operable to store the buffer location of the message-in buffer associated with the second one of the plurality of local communication processors in response to an unavailability of the empty buffer in the pool of buffers.

19. The system of claim 18, wherein the local controller provides the second one of the plurality of local communication processors with an indication that there is no currently available message-in buffer to receive new telecommunications information, the second one of the plurality of local communication processors queuing further telecommunication information until a new message-in buffer is made available.

20. The system of claim 15, further comprising:

a remote communication processor outside the local telecommunications network, the local controller assigning an empty buffer from the pool of buffers as a remote message-in buffer, the local controller assigning empty buffers to the second one of the plurality of communication processors and the remote communication processor on an equitable basis.

21. The system of claim 15, further comprising:

a starvation queue associated with the plurality of local communication processors, the starvation queue operable to store an identity of the second one of the plurality of local communication processors upon an indication that there is no available space within the message-out queue associated with the first one of the plurality of local communication processors.

22. The system of claim 21, wherein the second one of the plurality of local communication processors is disabled upon queue placement of its identity into the starvation queue.

23. The system of claim 22, wherein the second one of the plurality of local communication processors is enabled upon placement of the buffer location into the message-out queue associated with the first one of the plurality of local communication processors in response to available space within the message-out queue, the identity of the second one of the plurality of local communication processors being removed from the starvation queue upon enablement.

* * * * *